Aug. 4, 1953     E. F. KAISER ET AL     2,647,788
VEHICLE BODY CONVERTIBLE INTO AN ARTICLE-CARRYING BODY
Filed Dec. 6, 1949     4 Sheets-Sheet 2

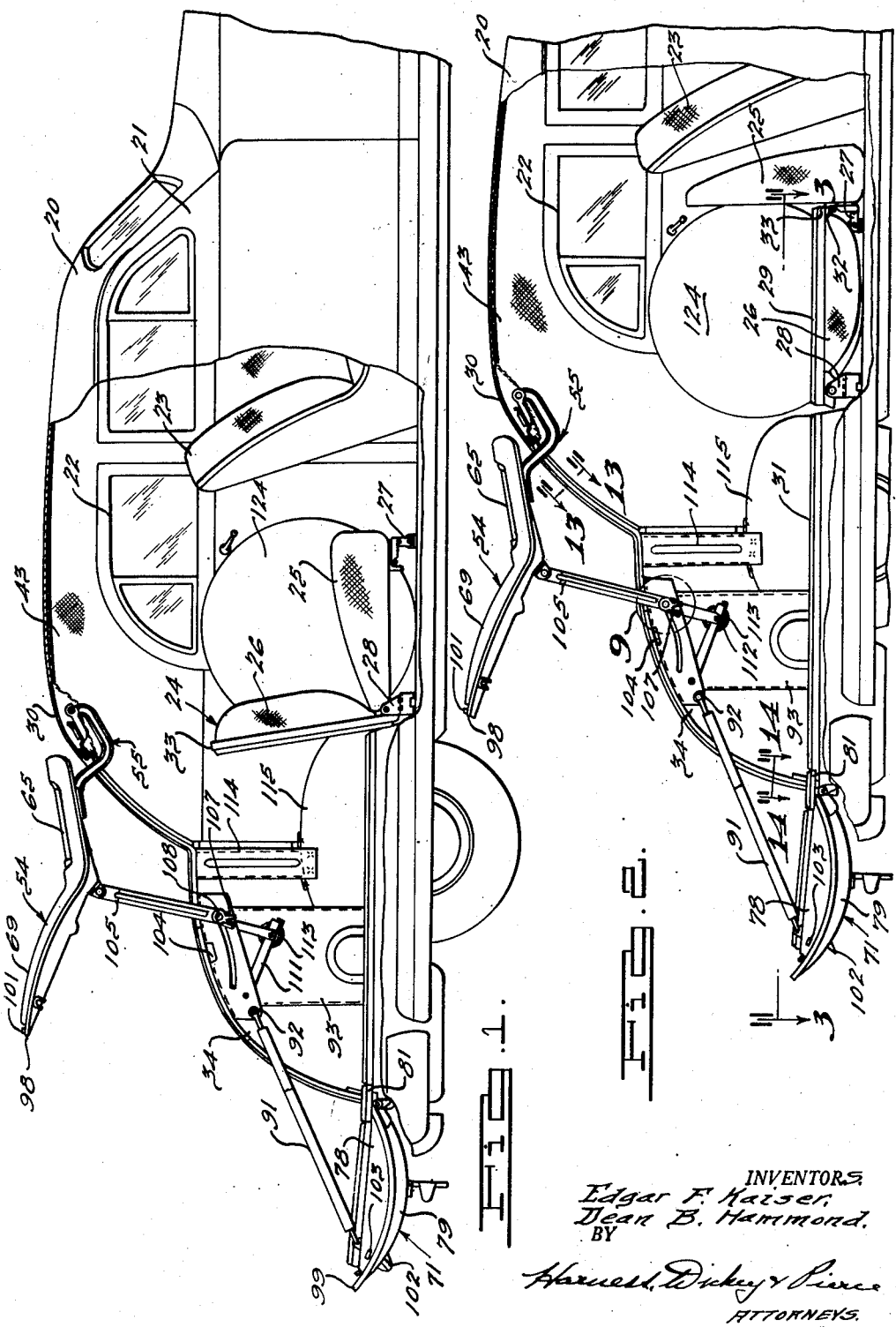

INVENTORS.
Edgar F. Kaiser,
Dean B. Hammond.
BY
Harness, Dickey & Pierce.
ATTORNEYS.

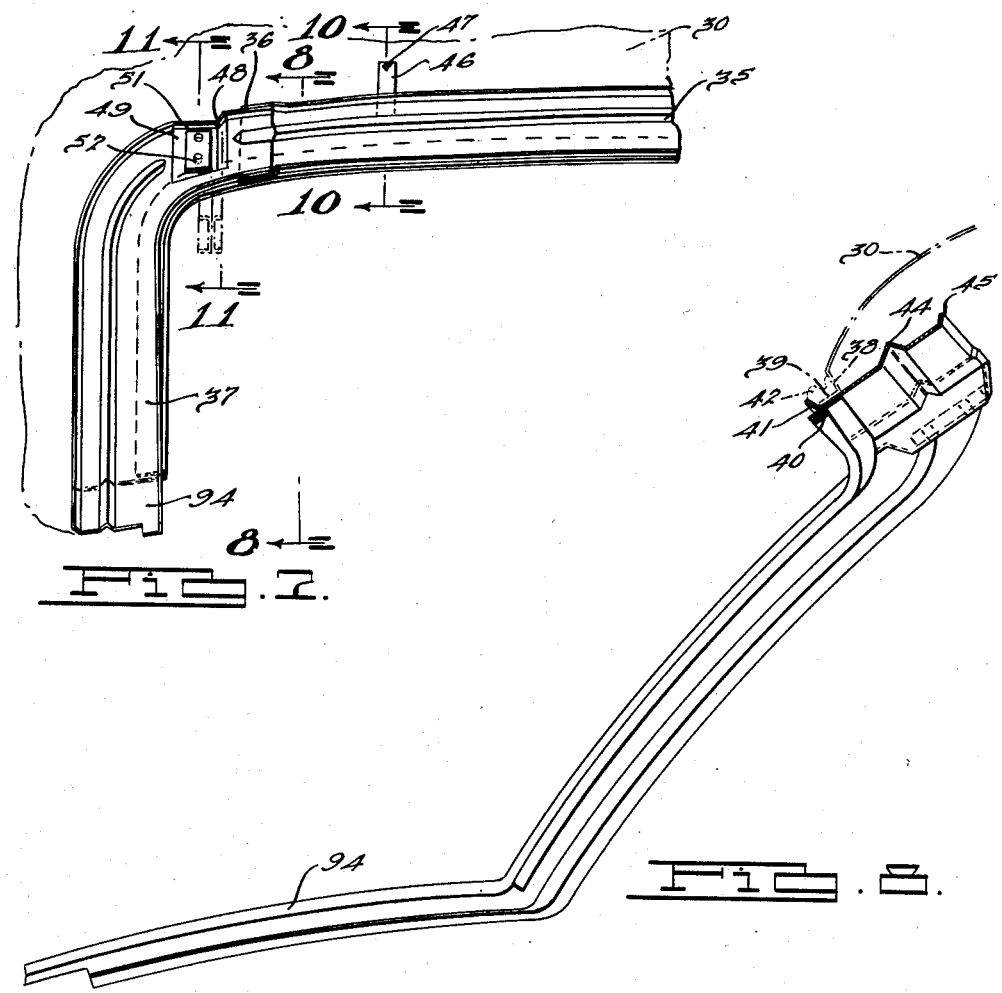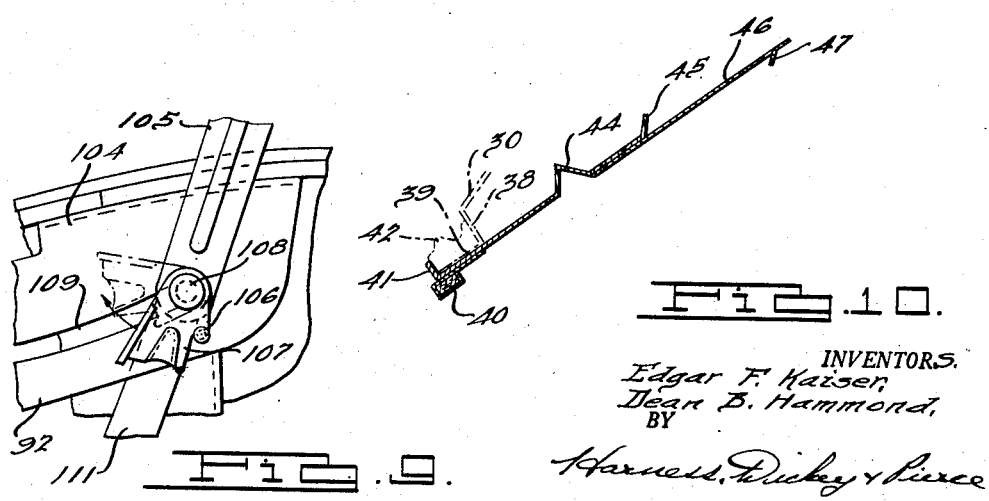

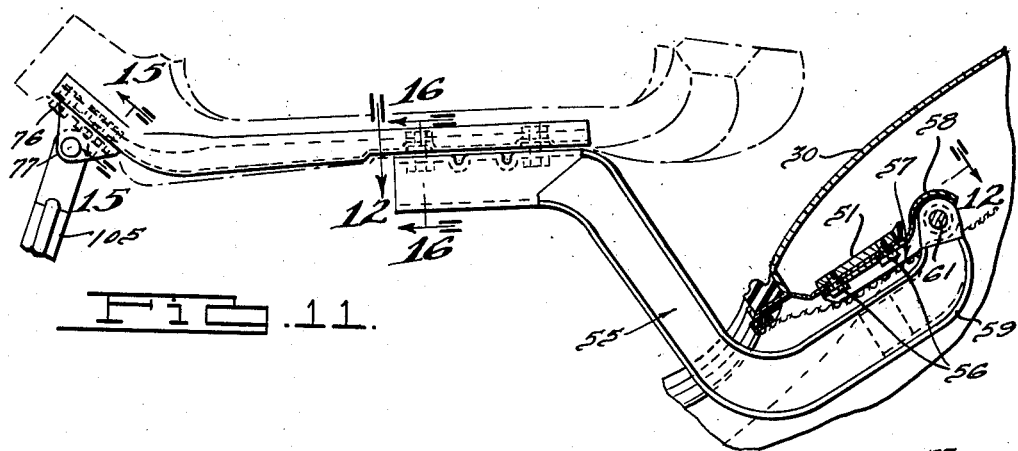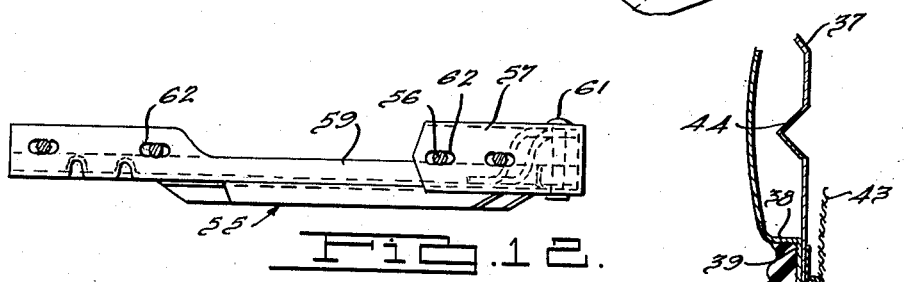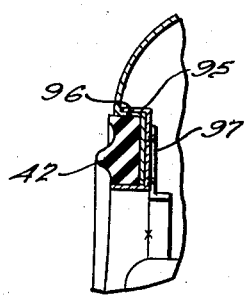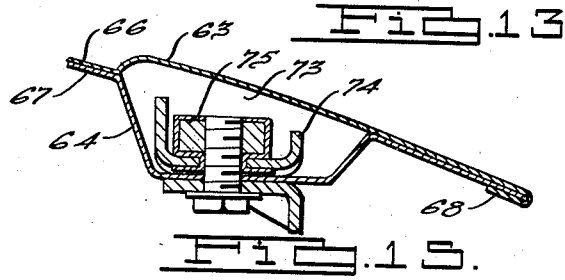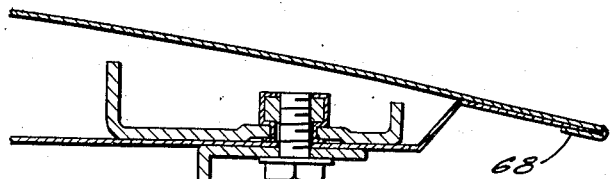

Patented Aug. 4, 1953

2,647,788

UNITED STATES PATENT OFFICE 2,647,788

VEHICLE BODY CONVERTIBLE INTO AN ARTICLE-CARRYING BODY

Edgar F. Kaiser and Dean B. Hammond, Ann Arbor, Mich., assignors to Kaiser-Frazer Corporation, Willow Run, Mich., a corporation of Nevada Application December 6, 1949, Serial No. 131,375

7 Claims. (Cl. 296—28)

This invention relates to automotive vehicle bodies, and particularly to a body of the utility type which may be converted from a passenger to a load-carrying vehicle.

Attempts have been made heretofore to provide a utility car which may be employed to haul loads as well as to carry passengers. This was known as the station wagon but it lacked beauty in appearance and comfort for passenger use.

The body of the present invention is of standard design, preferably of the four-door type, although it is to be understood that a two-door type of body could be utilized for the same purpose. The deck opening in the rear of the body is extended upwardly through the belt line and rear quarter panel about and above the rear window. This leaves all of the space between the side quarters and side deck panels entirely open so that crates, barrels and articles of large dimension may be passed through the opening into the interior of the body. To provide room within the body for such articles, the rear seat is so constructed as to fold forwardly with the back of the seat forming an extension of the floor forwardly of the deck floor. The deck lid is hinged below the floor line of the body so as to open outwardly and downwardly, thereby extending the floor outwardly of the deck floor. The opening above the deck door is closed by an upper lid portion and contains the upper part of the deck panel and the central portion of the rear quarter panel including the rear window.

The upper lid containing the rear window is hinged to reinforcing elements secured to the roof and side quarter panels on the inside of the body at the edge of the opening. The upper lid is supported in raised position by suitable arms which are spring-balanced to compensate for the weight of the lid. The upper hinged lid is first dropped down to close the rear quarter and upper deck opening, after which the lower lid is hinged upwardly and inwardly to overlap the upper lid. A single latch on the lower panel secures the two panels in latched position. The license plate lamps and holder are hinged to the lower deck lid in a manner which allows them to be moved from a position against the panel when in closed position to a position extending downwardly therefrom when in lowered position. This maintains the license plate substantially in a vertical plane in both positions of the lower deck lid.

Accordingly, the main objects of the invention are: to provide a vehicle body having the appearance of a two or four-door type, with a deck opening extended upwardly to include the rear which is closed by a top and bottom lid which are hinged to the body, respectively, at the top and bottom of the opening; to provide an opening at the rear of the body between the sides extending downwardly from the roof into the deck opening, the upper closure lid of which contains a rear window; to provide a lower closure lid for the deck opening at the rear of the vehicle body which is hinged at the lower edge to be an extension of the rear deck floor when lowered and to overlap the upper closure lid when both lids are in closed position to retain the upper lid in locked position when the lower lid is latched to the body; to provide reinforcing members about the sides and top of the opening in the rear quarter panel of the body on which the upper closure lid is supported by hinges secured to the reinforcing elements; to provide supporting links for the upper closure lid at the rear opening in the body which are supported on spring-actuated links for balancing the load of the lid throughout its path of movement when moved to raised position; to provide a rear seat in the body having a seat cushion which swings forwardly into abutting relation with the back of the front seat and a back cushion which hinges downwardly to have the back surface disposed in the plane of the deck floor when its forward edge engages a projection on the tilted seat cushion; and, in general, to provide a vehicle body which has all the appearance of a standard passenger vehicle but which has an opening in the rear portion closed by an upper and lower lid, all of which is simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken side view in elevation, showing the convertible rear end of the body, embodying features of the present invention;

Fig. 2 is a view of structure illustrated in Fig. 1, with the rear seat folded forwardly to extend the rear deck floor;

Fig. 6 is an enlarged sectional view of the structure illustrated in Fig. 3, taken on the line 6—6 thereof;

Fig. 7 is a broken enlarged view of a reinforcing strip provided about the upper part of the opening;

Fig. 8 is an enlarged sectional view of the structure illustrated in Fig. 7, taken on the line 8—8 thereof;

Fig. 9 is an enlarged view of the latch on the supporting link, as viewed in the circle 9 of Fig. 2;

Fig. 10 is an enlarged sectional view of the structure illustrated in Fig. 7, taken on the line 10—10 thereof;

Fig. 11 is an enlarged sectional view of the structure illustrated in Fig. 7, taken on the line 11—11 thereof;

Fig. 12 is a sectional view of the structure illustrated in Fig. 11, taken on the line 12—12 thereof;

Fig. 13 is an enlarged sectional view of the structure illustrated in Fig. 2, taken on the line 13—13 thereof;

Fig. 14 is an enlarged sectional view of the structure illustrated in Fig. 2, taken on the line 14—14 thereof;

Fig. 15 is an enlarged sectional view of the structure illustrated in Fig. 11, taken on the line 15—15 thereof; and Fig. 16 is an enlarged sectional view of the structure illustrated in Fig. 11, taken on the line 16—16 thereof.

Figure 3:
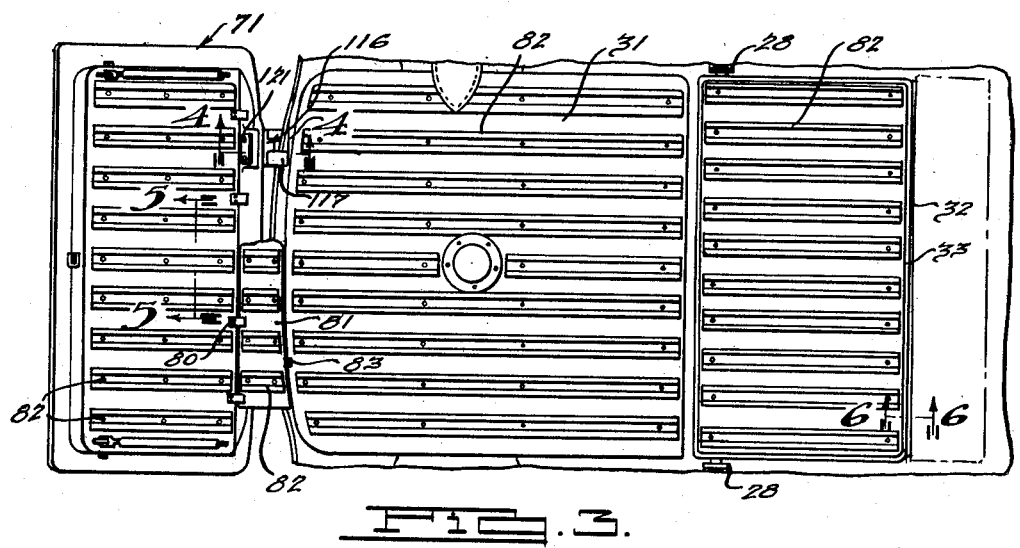
Fig. 3 is a sectional view of the structure illustrated in Fig. 2, taken on the line 3—3 thereof.

A vehicle body of the four-door type is illustrated in Figs. 1 and 2, having a left and right front door 21 and a left and right rear door 22. While the body of the present invention is illustrated and described with regard to a body of the four-door type, it is to be understood that a body of the two-door or other type may have the invention applied thereto in the same manner. The body is provided with a front seat 23, a chassis frame, wheels and the like, all of which are of standard form. In appearance, the body is exactly like that of any standard automotive vehicle but differs therefrom at the rear end which may be opened to convert the vehicle to one having an article-carrying body.

An opening is provided in the body between the rear deck and the side quarter panels above the floor panels to have all of the central portion of the rear of the body entirely open. An upper lid assembly is provided for closing the upper portion of the opening and to serve as the top rear deck portion of the body when in lowered position. A window is provided in the upper lid to be exactly like the rear window normally employed at the rear of a vehicle body. A reinforcing element is secured at the side and across the top of the opening to reinforce the metal defining the opening.

A lower deck lid is provided to close the lower part of the opening. The bottom edge of the lower deck lid is supported on a piano hinge outwardly of the curvature of the rear end of the body to permit the lid to be drawn downwardly into alignment with the deck floor. A rear seat 24, mounted in the rear seating compartment of the car, comprises a seat cushion 25 and a back cushion 26. The seat cushion 25 is supported on a pair of spaced brackets 27 for forward tilting movement, as illustrated in Fig. 2, to be disposed in vertical parallel relationship to the back of the front seat 23. The rear cushion 26 is pivoted on a pair of spaced brackets 28 to permit the back cushion to pivot forwardly to have the back 29 thereof aligned with the deck floor 31, thereby extending the deck floor forwardly substantially to the rear of the front seat 23. An angle element 32 is provided on the under side of the cushion 25 in position to form a flange for engaging the ledge 33 at the top of the cushion to thereby rigidly support the front end of the seat and to prevent the weight on the back thereof from resting upon the front sprung portion of the cushion.

The usual deck opening 34 is provided in the rear of the body, the rear deck panel and the rear quarter panel being cut away to extend the opening up to the top of the roof panel. Similarly, the deck portion is extended to or below the plane of the deck floor 31. This large opening permits the passage of large objects into the main compartment of the vehicle body. A reinforcing header panel 35 is provided across the top of the opening in the roof panel, joined at each end at 36 to side reinforcing pillar elements 37 which are the same at each side of the vehicle body except for being left and right-handed. The roof panel 30, as illustrated more clearly in Fig. 10, is flanged downwardly at 38 and outwardly at 39 and spot-welded to the header panel 35 and pillar elements 37 in spaced relation to an upturned flange 41 at the terminal edge of the opening. Within the channels formed by the flange 21 and the panel portion 38, a rubber sealing strip 42 is secured in the conventional manner.

Beneath the flange 41 at the top and sides of the top panel down as far as the belt line, a tacking strip retainer 40 is welded, providing anchorage for tacks which secure the inner trim material 43 at the edge of the opening. The header 35 and the side reinforcing pillar elements 37 have a rib 44 provided centrally therein throughout their lengths for the purpose of adding longitudinal strength to the construction. For the same reason, the edge of the reinforcing elements 35 and 37, opposite to that having the marginal flange 41, is flanged at an angle at 45 to provide additional strength thereto. The header panel 35 has a plurality of projecting fingers 46 welded thereto, each having a pointed tongue 47 struck therefrom and presented downwardly for securing the padding material 43 thereto. The pillar elements 37, curving inwardly at the top in the region of the joint 36 with the header panel 35, have an offset portion 48 therein providing a platform 49 on which a hinge-securing plate 51 is welded or otherwise secured. The hinge plate is provided with a pair of tapped apertures 52 for receiving the screws which retain the hinge for the upper deck lid in fixed rigid relation thereto, as will be explained more fully hereinafter.

An upper deck lid 54 is pivotally secured by a pair of spaced hinges 55 to the plates 51 at the edge of the roof opening. One wing 57 of the hinges 55 is of channel section having bolts 56 extended therethrough when threaded into apertures in the plates 51. The web is arched at the top at 58 to receive the arcuate end portion of the wing 59 which is secured thereto by a pivot pin 61. The wing 59 is of Z formation, as illustrated more specifically in Figs. 1, 2 and 11, being made of right and left-hand stampings which are welded together to be exceedingly strong but light in weight. Slotted apertures 62 are provided in the ends of the wings 57 and 59 for permitting adjustment of the upper deck lid 54 on the hinges and the adjustment of the hinges relative to the header panel 35.

The upper deck lid is made of two stampings, an outer panel 63 and inner panel 64. The lid closes the opening in the rear of the roof panel and has an opening for a rear window 65 provided therein. The marginal end of the window opening is defined by a pair of flanges 66 and 67 which support the window molding. The marginal edges of the two panels abut each other and are secured together by having the edge portion of the outer panel 63 wrapped around the edge of the inner panel, as illustrated at 68 in Fig. 15. The rear window 65 is supported in the rear opening in the upper deck lid by a rubber supporting molding in the conventional manner.

The portion of the deck lid which forms the rear deck panel extends at an angle to the window-supporting portion, as illustrated at 69, so that the upper deck lid, when in closed position, forms the rear quarter and deck panel for the vehicle. This permits the lower deck lid 71 to be opening without disturbing the upper deck lid. The hollow opening 73 at each side of the window is reinforced by a plate 74 of channel section having shouldered nuts 75 secured thereto for receiving bolts 76 which support the lid on the leaf 59 of the hinge 55. The plates 74 extend beyond the quarter panel portion to the lower edge of the deck portion and at an intermediate point fixed supporting brackets 77 are secured by bolts 76.

Figure 4:
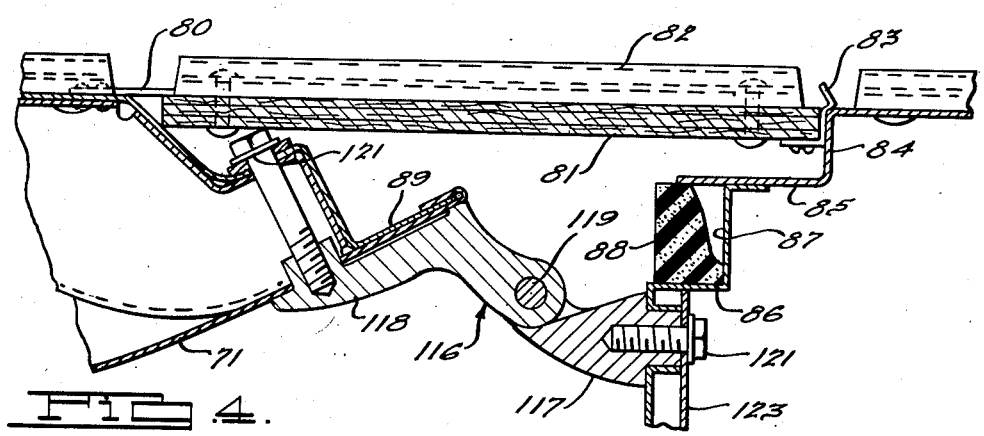
Fig. 4 is an enlarged sectional view of the structure illustrated in Fig. 3, taken on the line 4—4 thereof.
Figure 5:
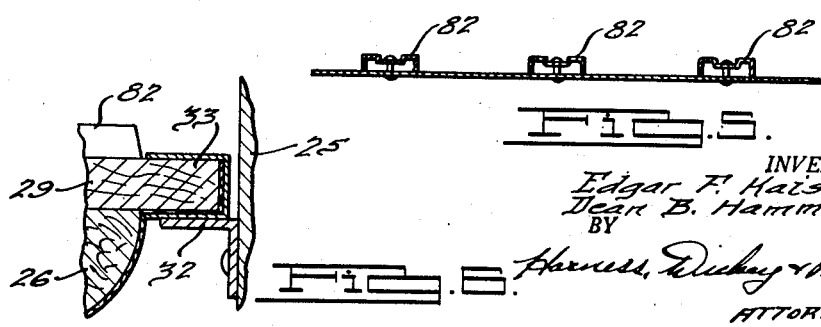
Fig. 5 is an enlarged sectional view of the structure illustrated in Fig. 3, taken on the line 5—5 thereof.

The lower deck lid 71 is made of an inner stamping 78 and an arcuate outer stamping 79, secured together in the same manner as the inner and outer panels 63 and 64 of the upper deck lid. The inner panel 78 is made flat to be disposed in continuation of the deck panel 81 to extend the length thereof outwardly of the vehicle body when in lowered position. As noted in Fig. 4, a space is provided between the lowered deck lid and the deck floor when the deck lid is open, spanned by a filler panel 81. When an object is placed upon the surface of the deck lid, it may be slid into the body over the filler panel 81, the deck floor 31, onto the panel 29 of the forwardly disposed rear seat back. As illustrated more specifically in Fig. 5, the panels are provided with runners 82 on which the objects rest when slid into and out of the body. The filler panel 81 is secured in position by having the rear edge secured under tabs 80 projecting from the lower deck lid 71 and by the spring fingers 83 at the forward edge which engage the shoulder 84 at the edge of the deck panel.

The rear of the deck floor is extended at 85 and joined to an end body stamping 86 in a manner to provide a channel 87 in which a rubber sealing strip 88 is secured. The bottom ledge 89 of the lower deck lid 71 abuts the strip 88 when the lid is closed to be in sealed relation therewith. When in open position, the lower deck lid 71 is supported at each side by chains 91 which are secured to a reinforcing plate 92 at each side of the body. The reinforcing plate 92 is supported on a reinforcing filler element 93 to which the ends 94 of the pillar elements 37 are secured. The end 94 is projected to mate with a channel element 95 which receives the inward flange edge 96 of the side panel at the deck opening. The sealing strip 42 is supported in the channel 95 at the sides of the deck opening. The web of the channel 95 has an angle reinforcing element 97 welded thereto forming a terminal reinforcing edge at both sides of the deck opening.

A seal is provided at both sides and across the top and bottom of the opening by the sealing strips 42 and 88. The strips are engaged by the projecting ledge about the upper and lower deck lids when in closed position. The upper deck lid 54 has a downwardly offset flange 98 at its lower edge which is overlapped by the top projecting flange 99 of the lower deck lid 81 when both lids are in closed position. A rubber sealing strip 101 is provided on the ledge 98 which seals the joint between the upper and lower lids laterally across the opening, substantially in a horizontal plane. The lower deck panel is provided with a handle 102 which actuates a pair of latch bars 103 which project from the sides of the lower deck lid to extend within apertures 104 in the reinforcing plates 92 at each side of the deck opening.

A supporting arm 105 is provided at each side of the deck opening, one end of which is pivoted to the supporting bracket 77 of the upper deck lid, the opposite end of which is pivoted on pin 108 which has a latching trigger 107 pivoted thereon. The pin 108 operates in an arcuate slot 109 in the supporting plate 92 and is attached to one end of a pair of toggle arms 111. The toggle arms are pivoted together by a pin 112 to which one end of a spring 113 is secured to be tensioned when the arm 105 is lowered and which assists the lifting of the upper deck lid. The trigger 107 engages the pin 106 to retain the arms 105 in lid holding position. When the lid is to be lowered, it is first raised to disengage the trigger 107 from the pin 106 and the lid is then lowered. During the lowering operation, the pin 108 moves to the rear in the slot 109, moving the toggle arms 111 together and tensioning the spring 113. Additional reinforcement is provided to the deck opening by pillars 114 which are secured to the edge of the belt line of the body at the upper end and to the wheel housings 115 at the lower end.

The rear terminal body panel 86 is curved laterally across the body, requiring a cast hinge 116 of special construction for supporting the rear deck lid 71 to the body. The casting has two wings 117 and 118 joined by a pin 119 in piano hingelike connection. A plurality of bolts 121 secure the hinge wing 117 to the rear terminal body panel 86 which is reinforced by the plate 123. The wing 118 is secured to the lower deck lid 71 by bolts 121.

The floor space thus provided in the standard type of vehicle body, as illustrated in Fig. 3, is substantially four feet wide between the wheel housings 115 and substantially nine feet long when extended forwardly by the floor portion 29 of the seat back and rearwardly by the panel of the lower deck lid 71 and the filler panel 81. A large storage compartment is provided to the vehicle body without interfering with the driver's compartment, including the front seat and the area forwardly thereof. When the deck lids are closed, the front and rear seats are available for passengers so that the body may be employed as in a passenger-carrying vehicle. The vehicle body is converted to an article-carrying or a delivering-type of body by shifting the cushions of the rear seat forwardly and adding the filler panel 81 when the lower deck lid is down.

While the spare wheel 124 may be carried at any point within the body for convenience, the wheel, as illustrated in Figs. 1 and 2, is supported at the side of the left rear door. In this arrangement the left rear door may be welded into place so that it may not be opened. It is to be understood that the wheel may be placed under the hood or body outside of the interior carrying area. The body herein illustrated provides a dual purpose vehicle, one which may be used for carrying passengers which is no different in appearance from a standard type of passenger-carrying automobile but which may be converted to an article-carrying vehicle in a manner as described in detail above.

What is claimed is:

1. In a vehicle body of the conventional type having a belt line and a rear window, said body also having a rear deck opening extended from the deck floor to above the rear window, an upper deck lid for said opening containing said rear window, a lower deck lid in said opening, reinforcing elements extending across the top of the opening at the marginal edge thereof and downwardly along each side to the belt line and rearwardly along the deck opening, and a pillar at each side of the body for connecting said reinforcing element to the deck floor.

2. In a vehicle body of the conventional type having a belt line and a rear window, said body also having a rear deck opening extended from the deck floor to above the rear window, an upper deck lid for said opening containing said rear window, a lower deck lid in said opening, reinforcing elements extending across the top of the opening at the marginal edge thereof and downwardly along each side to the belt line and rearwardly along the deck opening, a pillar at each side of the body for connecting said reinforcing element to the deck floor, and additional pillars connecting the reinforcing elements adjacent to the belt line to the rear wheel housings.

3. In a vehicle body of the conventional type having a belt line and a rear window, said body also having a rear deck opening extended from the deck floor to above the rear window, an upper deck lid for said opening containing said rear window, a lower deck lid in said opening, reinforcing elements extending across the top of the opening at the marginal edge thereof and downwardly along each side to the belt line and rearwardly along the deck opening, a pillar at each side of the body for connecting said reinforcing element to the deck floor, additional pillars connecting the reinforcing elements adjacent to the belt line to the rear wheel housings, said reinforcing elements being secured to the edge of the body, panels for projecting outwardly therefrom to form a channel therewith, and a sealing strip disposed in said channel from the top and along the side of the opening to the deck floor.

4. In a vehicle body of the conventional type having a belt line and a rear window, said body also having a rear deck opening extended from the deck floor to above the rear window, an upper deck lid for said opening containing said rear window, a lower deck lid in said opening, reinforcing elements extending across the top of the opening at the marginal edge thereof and downwardly along each side to the belt line and rearwardly along the deck opening, a pillar at each side of the body for connecting said reinforcing element to the deck floor, additional pillars connecting the reinforcing elements adjacent to the belt line to the rear wheel housings, said reinforcing elements being secured to the edge of the body, panels for projecting outwardly therefrom to form a channel therewith, a sealing strip disposed in said channel from the top and along the side of the opening to the deck floor, plates secured to the reinforcing pillars and elements at the side of the deck opening, and means for connecting said plates to the lower deck lid for limiting its downward movement.

5. In a vehicle body of the conventional type having a belt line and a rear window, said body also having a rear deck opening extended from the deck floor to above the rear window, an upper deck lid for said opening containing said rear window, a lower deck lid in said opening, reinforcing elements extending across the top of the opening at the marginal edge thereof and downwardly along each side to the belt line and rearwardly along the deck opening, a pillar at each side of the body for connecting said reinforcing element to the deck floor, additional pillars connecting the reinforcing elements adjacent to the belt line to the rear wheel housings, said reinforcing elements being secured to the edge of the body, panels for projecting outwardly therefrom to form a channel therewith, a sealing strip disposed in said channel from the top and along the side of the opening to the deck floor, plates secured to the reinforcing pillars and elements at the side of the deck opening, means for connecting said plates to the lower deck lid for limiting its downward movement, and latchable arms connecting the upper deck lid to said plates for holding said upper deck lid in raised position.

6. In a vehicle body of the conventional type having a belt line and a rear window, said body also having a rear deck opening extended from the deck floor to above the rear window, an upper deck lid for said opening containing said rear window, a lower deck lid in said opening, reinforcing elements extending across the top of the opening at the marginal edge thereof and downwardly along each side to the belt line and rearwardly along the deck opening, a pillar at each side of the body for connecting said reinforcing element to the deck floor, additional pillars connecting the reinforcing elements adjacent to the belt line to the rear wheel housings, said reinforcing elements being secured to the edge of the body, panels for projecting outwardly therefrom to form a channel therewith, a sealing strip disposed in said channel from the top and along the side of the opening to the deck floor, plates secured to the reinforcing pillars and elements at the side of the deck opening, means for connecting said plates to the lower deck lid for limiting its downward movement, latchable arms connecting the upper deck lid to said plates for holding said upper deck lid in raised position, and counterbalancing spring means connected to the end of the arms and supported by said plate for counterbalancing the operation of the upper deck lid.

7. In a vehicle body of the conventional type having a belt line and a rear window, said body also having a rear deck opening extended from the deck floor to above the rear window, an upper deck lid for said opening containing said rear window, a lower deck lid in said opening, reinforcing elements extending across the top of the opening at the marginal edge thereof and downwardly along each side to the belt line and rearwardly along the deck opening, a pillar at each side of the body for connecting said reinforcing element to the deck floor, additional pillars connecting the reinforcing elements adjacent to the belt line to the rear wheel housings, said reinforcing elements being secured to the edge of the body, panels for projecting outwardly therefrom to form a channel therewith, a sealing strip disposed in said channel from the top and along the side of the opening to the deck floor, plates secured to the reinforcing pillars and elements at the side of the deck opening, means for connecting said plates to the lower deck lid for limiting its downward movement, latchable arms connecting the upper deck lid to said plates for holding said upper deck lid in raised position, counterbalancing spring means connected to the end of the arms and supported by said plate for counterbalancing the operation of the upper deck lid, and a slot in said plate along which the ends of the arms are guided when actuating said spring counterbalancing means.

EDGAR F. KAISER.
DEAN B. HAMMOND.

References Cited in the file of this patent

UNITED STATES PATENTS

| Number | Name | Date |
|---|---|---|
| D. 124,784 | Sopchick | Jan. 21, 1941 |
| 1,894,103 | Kuenzel | Jan. 10, 1933 |
| 2,102,110 | Burkey | Dec. 14, 1937 |
| 2,152,505 | Stuart et al. | Mar. 28, 1939 |
| 2,164,435 | Suchanek | July 4, 1939 |
| 2,229,315 | Sullivan | Jan. 21, 1941 |
| 2,263,065 | Baldauf | Nov. 18, 1941 |
| 2,538,930 | Zummach | Jan. 23, 1951 |

FOREIGN PATENTS

| Number | Country | Date |
|---|---|---|
| 836,168 | France | Oct. 10, 1938 |